US010313752B2

(12) United States Patent
Nagaraja Rao et al.

(10) Patent No.: US 10,313,752 B2
(45) Date of Patent: Jun. 4, 2019

(54) METHODS AND APPARATUS TO ESTIMATE DEDUPLICATED TOTAL AUDIENCES IN CROSS-PLATFORM MEDIA CAMPAIGNS

(71) Applicant: The Nielsen Company (US), LLC, New York, NY (US)

(72) Inventors: Kumar Nagaraja Rao, Fremont, CA (US); William Rene Waldron, Ellicott City, MD (US); Neung Soo Ha, Bethesda, MD (US); Billie Jo Kline, Inverness, FL (US); Michael Morgan, Bartlett, IL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 15/363,877

(22) Filed: Nov. 29, 2016

(65) Prior Publication Data

US 2017/0155956 A1   Jun. 1, 2017

Related U.S. Application Data

(60) Provisional application No. 62/261,253, filed on Nov. 30, 2015.

(51) Int. Cl.
*H04N 21/442* (2011.01)
*G06F 17/30* (2006.01)
(Continued)

(52) U.S. Cl.
CPC ..... *H04N 21/44222* (2013.01); *G06F 16/215* (2019.01); *G06Q 10/00* (2013.01);
(Continued)

(58) Field of Classification Search
None
See application file for complete search history.

(56) References Cited

U.S. PATENT DOCUMENTS 7,039,931 B2 * 5/2006 Whymark .............. G06Q 30/02
                                                     348/E7.063
8,234,151 B1   7/2012 Pickton et al.
(Continued)

*Primary Examiner* — Jason K Lin
(74) *Attorney, Agent, or Firm* — Hanley Flight & Zimmerman, LLC

(57) ABSTRACT

Methods, apparatus, systems and articles of manufacture to estimate deduplicated total audiences in cross-platform media campaigns are disclosed. An example method includes determining a first audience reach for a television audience, the television audience representative of audience members exposed to the media campaign via television media delivery, and determining a second audience reach for a digital audience, the digital audience representative of audience members exposed to the media campaign via digital media delivery. The example method also includes an overlap multiplier based on the media campaign, the overlap multiplier an odds ratio, and determining a duplication factor for the media campaign based on the first audience reach, the second audience reach and the overlap multiplier. The example method also includes determining a total audience for the media campaign based on the first audience reach, the second audience reach and the duplication factor.

15 Claims, 5 Drawing Sheets

(51) Int. Cl.
*G06Q 30/02* (2012.01)
*H04N 21/81* (2011.01)
*H04N 21/466* (2011.01)
*G06F 16/215* (2019.01)
*G06Q 10/00* (2012.01)
*G06Q 30/00* (2012.01)
*H04H 60/31* (2008.01)
*H04H 60/66* (2008.01)

(52) U.S. Cl.
CPC ......... *G06Q 30/00* (2013.01); *G06Q 30/0246* (2013.01); *H04H 60/31* (2013.01); *H04H 60/66* (2013.01); *H04N 21/4667* (2013.01); *H04N 21/812* (2013.01)

(56) References Cited

U.S. PATENT DOCUMENTS

| | | | |
|---|---|---|---|
| 8,297,977 B2 | 10/2012 | Freund | |
| 8,327,396 B2* | 12/2012 | Ramaswamy | H04L 12/66 725/14 |
| 8,364,516 B2* | 1/2013 | Anderson | G06Q 10/10 705/7.29 |
| 8,370,489 B2* | 2/2013 | Mazumdar | H04L 43/04 709/220 |
| 8,874,652 B1 | 10/2014 | Pecjak et al. | |
| 8,935,713 B1* | 1/2015 | Gabel | H04H 60/65 705/14.53 |
| 8,973,023 B1* | 3/2015 | Rao | H04N 21/44222 705/14.44 |
| 9,122,694 B1* | 9/2015 | Dukes | G06F 17/30336 |
| 9,129,214 B1 | 9/2015 | Gomez-Uribe et al. | |
| 9,159,095 B1* | 10/2015 | Smith | G06Q 30/0641 |
| 9,253,550 B1* | 2/2016 | Smith | H04N 21/812 |
| 9,286,621 B2* | 3/2016 | Dubey | G06Q 30/0242 |
| 9,292,856 B1* | 3/2016 | Niederstrasser | G06Q 30/02 |
| 9,313,294 B2* | 4/2016 | Perez | H04L 67/306 |
| 9,674,567 B1* | 6/2017 | Carter | H04N 21/2668 |
| 9,852,163 B2* | 12/2017 | Srivastava | G06F 17/30303 |
| 9,872,083 B2* | 1/2018 | Francis | H04N 21/26241 |
| 9,980,010 B2* | 5/2018 | Ray | H04N 21/252 |
| 2009/0292587 A1* | 11/2009 | Fitzgerald | G06Q 30/02 705/7.29 |
| 2009/0307084 A1 | 12/2009 | Monighetti et al. | |
| 2011/0288907 A1* | 11/2011 | Harvey | G06Q 10/0639 705/7.29 |
| 2013/0013372 A1 | 1/2013 | Gomez Uribe et al. | |
| 2014/0278914 A1* | 9/2014 | Gurumoorthy | G06Q 30/0243 705/14.42 |
| 2014/0317114 A1* | 10/2014 | Alla | G06Q 30/0241 707/737 |
| 2015/0095138 A1 | 4/2015 | Rao et al. | |
| 2015/0201031 A1 | 7/2015 | James et al. | |
| 2016/0027037 A1* | 1/2016 | Cai | G06Q 30/0243 705/14.42 |
| 2016/0269783 A1 | 9/2016 | Mowrer et al. | |
| 2017/0034591 A1* | 2/2017 | Ray | H04L 65/4084 |
| 2017/0034592 A1* | 2/2017 | Ray | G06Q 30/0251 |
| 2017/0034593 A1* | 2/2017 | Ray | H04N 21/2543 |

* cited by examiner

US 10,313,752 B2

METHODS AND APPARATUS TO ESTIMATE DEDUPLICATED TOTAL AUDIENCES IN CROSS-PLATFORM MEDIA CAMPAIGNS

RELATED APPLICATION

This patent claims the benefit of, and priority from, U.S. Provisional Patent Application No. 62/261,253, filed on Nov. 30, 2015, entitled "Total Content Ratings." U.S. Provisional Patent Application No. 62/261,253 is hereby incorporated herein by reference in its entirety.

FIELD OF THE DISCLOSURE

This disclosure relates generally to audience measurement and, more particularly, to methods and apparatus to estimate deduplicated total audiences in cross-platform media campaigns.

BACKGROUND

Audience measurement of media (e.g., content and/or advertisements presented by any type of medium, such as television, in theater movies, radio, Internet, etc.) is typically carried out by monitoring media exposure of panelists that are statistically selected to represent particular demographic groups. Audience measurement companies, such as The Nielsen Company (US), LLC, enroll households and persons to participate in measurement panels. By enrolling in these measurement panels, households and persons agree to allow the corresponding audience measurement company to monitor their exposure to information presentations, such as media output via a television, a radio, a computer, a smart device, etc. Using various statistical methods, the collected media exposure data is processed to determine the size and/or demographic composition of the audience(s) for media of interest. The audience size and/or demographic information is valuable to, for example, advertisers, broadcasters, content providers, manufacturers, retailers, product developers and/or other entities. For example, audience size and demographic information is a factor in the placement of advertisements, in valuing commercial time slots during a particular program and/or generating ratings for piece(s) of media.

BRIEF DESCRIPTION OF THE DRAWINGS

Wherever possible, the same reference numbers will be used throughout the drawing(s) and accompanying written description to refer to the same or like parts.

DETAILED DESCRIPTION

Figure 1:
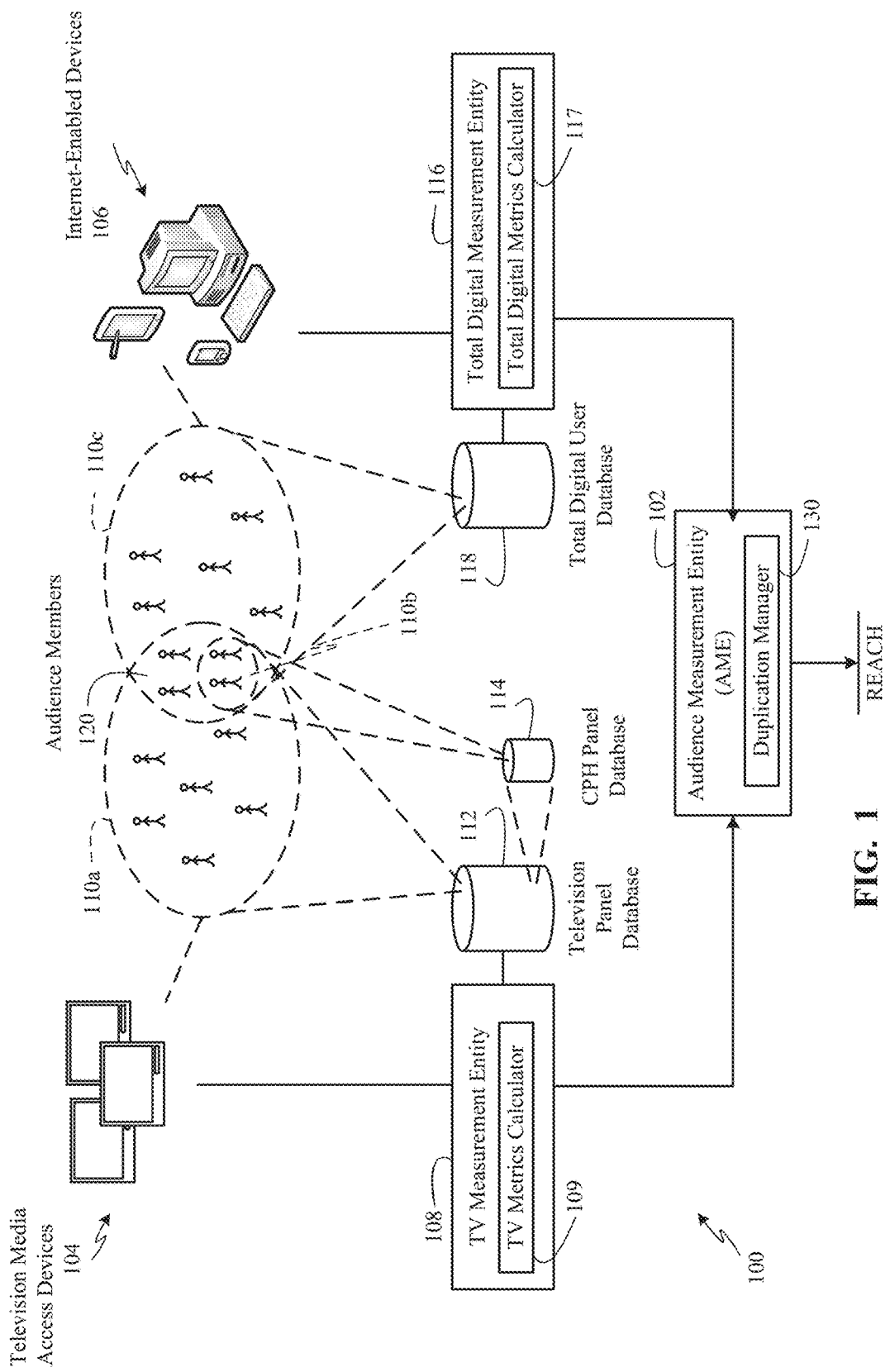
FIG. 1 depicts an example cross-platform media campaign environment in which exposures of television and Internet media campaigns are monitored for respective television and online audience members.

Example methods, apparatus, and articles of manufacture disclosed herein enable determining audience duplication in cross-platform media campaigns. Examples disclosed herein may analyze television-based media campaigns delivered via televisions, and Internet-based media campaigns delivered via personal computers and/or mobile devices such as mobile phones, smart phones, tablet devices (e.g., an Apple iPad), multi-media phones, etc. Examples disclosed herein may be used to provide media providers with campaign exposure information to enable such media providers to make more informed decisions about where to spend, for example, advertising dollars, and/or how to distribute advertisements. Such examples are beneficial to marketers, product manufacturers, service companies, advertisers, and/or any other individual or entity that pays for advertising opportunities within the media campaign.

Monitoring entities, such as television measurement entities, online measurement entities, total digital measurement entities, etc., track impressions of media and provide audience metrics based on the impressions. An impression refers to a recordation of a presentation of an item of media (e.g., from a media campaign) to an audience member. As used herein, the "audience" of a designated item of media refers to the number of persons who have viewed the designated item of media. An "audience member" of an audience refers to an individual person within the audience. Whereas the calculation of the audience of a media item may, in some examples disclosed herein, count a single audience member multiple times, the "unique audience" of a media is an audience of the media item in which each audience member is represented only once. "Reach" refers to the amount of a population that corresponds to the measured audience. For example, if the measured audience is 500 and the population of an area is 1,000, the reach for a given media campaign is ½ or 50% of the population.

Examples disclosed herein deduplicate total audience by determining an overlap multiplier representative of overlap in audience across platforms. In the illustrated example, the overlap multiplier is an odds ratio. For example, disclosed examples determine an overlap multiplier based on (1) a first reach associated with audience members who viewed the media via a TV platform, (2) a second reach associated with audience members who viewed the media via a digital platform, (3) a third reach associated with audience members who viewed the media via the TV platform and the digital platform, and (4) a fourth reach associated with audience members who did not view the media. In the illustrated example, the overlap multiplier is determined at a media hierarchy×genre level. Media hierarchy may refer to an episode level, a program level, an originator level, etc. Thus, disclosed examples determine a plurality of overlap multipliers. In some examples, the overlap multipliers are based on historic data. For example, audience metrics may be aggregated over a period (e.g., six months) and then processed to determine the overlap multipliers. In some examples, the overlap multipliers are retrieved from a deduplication factors repository. For example, the deduplication factors repository may access observed duplication across media platforms and generate deduplication factors based on the observed duplications. Example techniques for determining overlap multipliers (e.g., deduplication factors) are disclosed in U.S. patent application Ser. No. 15/338,301, filed on Oct. 28, 2016, entitled "Collapsed-Level Deduplication Based on a Data Matching System," which is hereby incorporated herein by reference in its entirety.

Disclosed examples then use the overlap multipliers to determine a duplication factor in a media campaign (e.g., a current media campaign). For example, disclosed examples may obtain audience metrics (e.g., reach) for the television platform and the digital platform for a media campaign. In the examples disclosed herein, digital media and online media are used interchangeably throughout. Disclosed examples also map the media campaign to a genre (e.g., comedy, drama, news, etc.) and obtain an overlap multiplier that corresponds to the media campaign based on the genre and the media hierarchy level. Disclosed examples then determine the duplication factor based on the audience metrics and the overlap multiplier. Examples disclosed herein apply the duplication factor to the total audience to determine a duplicated audience, which is then removed from the total audience to determine the deduplicated total audience for the cross-platform media campaign. In some examples, the operations are repeated at different media hierarchy levels to provide deduplicated total audience at different media hierarchy levels (e.g., at the episode level, at the program level, at the originator level, etc.).

FIG. 1 is an illustration of an example environment 100 implemented in accordance with the teachings of this disclosure to estimate deduplicated total audiences for cross-platform media campaigns. In the illustrated example of FIG. 1, the example cross-platform media campaign includes a television campaign delivered via television media access devices 104 and a corresponding digital campaign delivered via Internet-enabled devices 106. In the illustrated example, the television campaign and the digital campaign correspond to the same media campaign but are delivered via both media and digital media. For example, a user may watch a broadcast of an episode of "Comedy Show" during its regularly scheduled broadcast time via a television media access device 104. The user may then re-watch the same episode of "Comedy Show" the following day via an on-demand service via a television media access device 104 and/or an Internet-enabled device 106, and then re-watch the same episode of "Comedy Show" twenty days later via an Internet-enabled device 106.

The television media access devices 104 of the illustrated example include multiple types of devices via which television media is accessible. For example, the television media access devices 104 (e.g., the television platform) may include one or more of televisions, smart televisions and/or any other device that can access television media such as broadcast and/or streaming television media. The Internet-enabled devices 106 of the illustrated example include multiple types of devices that can access digital media. For example, the Internet-enabled devices 106 (e.g., the digital platform) may include one or more of computers, tablet devices, smart phones, smart televisions and/or any other device that can access digital media (e.g., web pages, streaming radio and/or streaming video, pictures, downloadable video, streaming/downloadable music, etc.).

To track television media impressions, a TV measurement entity 108 of the illustrated example recruits audience members to be part of a television (TV) audience member panel 110a by consenting to having their television viewing activities monitored. In some examples, the TV audience member panel 100a is implemented using Nielsen's National People Meter (NPM) panel. The TV measurement entity 108 of the illustrated example maintains a television panel database 112 to store panel member information such as demographics, media preferences and/or other personal or non-personal information suitable for describing characteristics, preferences, locations, etc. of audience members exposed to television media. To measure impressions of television media (e.g., television media including advertisements and/or programming), the TV measurement entity 108 monitors the viewing habits of members of the television audience member panel 110a and records impressions against different television media to which the television audience member 110a are exposed in the example television panel database 112.

In the illustrated example of FIG. 1, the TV measurement entity 108 includes a TV metrics calculator 109. The example TV metrics calculator 109 processes the TV impressions and determines TV audience metrics such as, for example, reach, audience size, etc. For example, the TV metrics calculator 109 may use example Equation 1 below to calculate reach for the TV audience (reach$_{TV}$).

$$\text{reach}_{TV} = \frac{\text{Audience}_{TV}}{UE} \qquad \text{Equation 1}$$

In Equation 1 above, the audience (audience$_{TV}$) variable represents the number of audience members who viewed the media program via a television access device 104 (e.g., via the TV platform). The universe estimate (UE) represents the population of an audience to be measured. For example, the universe estimate (UE) may correspond to an audience in a geographic area such as a city, a state, a region, a country, etc.

In the illustrated example, the TV metrics calculator 109 determines the TV audience metrics at different media hierarchy levels. For example, the TV metrics calculator 109 may determine an audience reach for a program "Comedy Hour" at the episode level, the program level and/or the originator level. In some examples, the calculations performed by the TV metrics calculator 109 are performed separately for each demographic group (e.g., each demographic bucket). For example, the TV metrics calculator 109 may process the TV impressions in the television panel database 112 to determine total TV audience reach for males 18-34 at the episode level of "Comedy Hour." In some examples, to simplify the formula, the superscript "(d)" (which represents a demographic group (d)) is ignored in all notations. For example, instead of (reach$_{TV}^{d}$), (reach$_{TV}$) is used to represent TV reach within demographic group (d).

In the illustrated example, an audience measurement entity (AME) 102 operates the TV measurement entity 108. To track digital media impressions, the AME 102 of the illustrated example partners with a total digital measurement entity 116 having registered users of their services. In the illustrated example, the AME 102 partners with the total digital measurement entity 116, which may be, for example, a social network site (e.g., Facebook, Twitter, MySpace, etc.), a multi-service site (e.g., Yahoo!, Google, Experian, etc.), an online retailer site (e.g., Amazon.com, Buy.com, etc.) and/or any other web service(s) site that maintain(s) user registration records. In some examples, when users register with the total digital measurement entity 116 to use one or more of its online services, the users agree to a terms of service (ToS) and/or online privacy policy of the total digital measurement entity 116 stating that some Internet usage information is used to track Internet viewing/usage activities.

The total digital measurement entity 116 of the illustrated example maintains a total digital user database 118 to store user registration information such as demographics, media preferences and/or other personal and/or non-personal information suitable for describing characteristics, preferences, locations, etc. of registered users exposed to digital media. To measure impressions of digital media (e.g., media including advertisements and/or programming), the total digital measurement entity 116 monitors online activities of its registered users and records impressions against different digital media to which the digital audience members 110c are exposed. The example total digital measurement entity 116 records the impressions of digital media in the example total digital user database 118.

In the illustrated example of FIG. 1, the total digital measurement entity 116 includes a total digital metrics calculator 117. The example total digital metrics calculator 117 processes the digital impressions and determines digital audience metrics such as, for example, reach, audience size, etc. For example, the digital metrics calculator 109 may use example Equation 2 below to calculate reach for the digital audience ($reach_{digital}$).

$$reach_{digital} = \frac{Audience_{digital}}{UE} \qquad \text{Equation 2}$$

In Equation 2 above, the audience ($audience_{digital}$) variable represents the number of audience members who viewed the media program via an Internet-enabled device 106 (e.g., via the digital platform). The universe estimate (UE) represents the population of an audience to be measured. For example, the universe estimate (UE) may correspond to a geographic area such as a city, a state, a region, a country, etc.

In the illustrated example, the total digital metrics calculator 117 determines the total digital audience metrics at different media hierarchy levels. For example, the total digital metrics calculator 117 may determine an audience reach for a program "Comedy Hour" at the episode level, the program level and/or the originator level (e.g., at a media hierarchy). In some examples, the calculations performed by the total digital metrics calculator 117 are performed separately for each demographic group (e.g., each demographic bucket). For example, the total digital metrics calculator 117 may process the digital impressions in the total digital user database 118 to determine total digital audience reach for males 18-34 at the episode level of "Comedy Hour." In some examples, to simplify the formula, the superscript "(d)" (which represents a demographic group (d)) is ignored in all notations. For example, instead of ($reach_{digital}^{d}$), ($reach_{digital}$) is used to represent total digital reach within demographic group (d).

In the illustrated example of FIG. 1, the total digital metrics calculator 117 calculates the digital audience metrics at a platform level. For example, the total digital metrics calculator 117 calculates a first set of metrics (e.g., reach, audience size, etc.) for mobile devices, a second set of metrics for PC devices etc. Because the users who access the digital media have registered with the total digital measurement entity 116, the example total digital metrics calculator 117 maps the users across the different digital platforms. Accordingly, the total digital metrics calculator 117 may also deduplicate audience between the digital platforms. For example, if a user views an episode of "Comedy Hour" on their smart phone and then re-watches the same episode on their personal computer, the example total digital metrics calculator 117 includes the user in a mobile audience count ($audience_{mobile}$) and a PC audience count ($audience_{PC}$), but the example total digital metrics calculator 117 only counts the user once in the total digital audience count ($audience_{digital}$).

In some examples, to measure impressions of digital media (e.g., web pages, streaming radio and/or streaming video, pictures downloadable video, streaming/downloadable music, etc.), the total digital measurement entity 116 installs personal computer (PC) meters on the Internet-enabled devices 106 of the digital audience members 110c to monitor the viewing habits of the digital audience members 110c. In the illustrated example, each PC meter in a corresponding Internet-enabled device 106 is provided with a unique meter ID that can be used to identify a digital audience member panelist and/or a digital audience household. Additionally or alternatively, any other impression collection technique(s) could be used including those in U.S. patent application Ser. No. 13/513,148 (now U.S. Pat. No. 8,370,489), filed on May 31, 2012, entitled "Methods and Apparatus to Determine Impressions Using Distributed Demographic Information," and U.S. patent application Ser. No. 14/127,414 (now U.S. Pat. No. 8,930,701), filed on Dec. 18, 2013, entitled "Methods and Apparatus to Collect Distributed User Information for Media Impressions and Search Terms." U.S. patent application Ser. No. 13/514,148 and U.S. patent application Ser. No. 14/127,414 are hereby incorporated herein by reference in their entirety. The total digital measurement entity 116 uses Internet usage activity data to log impressions against different digital media to which the digital audience members 110c were exposed.

As shown in the illustrated example of FIG. 1, some of the television audience members 110a are also digital audience members 110c, resulting in a subset of overlapping audience members 120. In some examples, the overlapping audience members 120 arise when persons in the television audience members 110a also subscribe to the services provided by the total digital measurement entity 116. In the illustrated example, the television audience members 110a include a subset of cross-platform home (CPH) audience panel members 110b that are also part of the digital audience 110c and access digital media via the Internet-enabled devices 106. The television panel database 112 of the illustrated example stores panel member information about those CPH audience panel members 110b in a CPH panel database 114 for use in tracking their digital media viewing habits.

In the illustrated example, the AME 102 and the total digital measurement entity 116 use online media tagging techniques to track media impressions. Such online media tagging techniques use ad tags or media tags, which are beacon instructions located in media (e.g., advertisements or content) downloaded to web browsers of client devices (e.g., the Internet-enabled devices 106). When the web browsers execute the beacon instructions, the web browsers send a beacon request to the online measurement entity 116 and/or the Internet service database proprietor 122 to log an impression for the corresponding online media. Examples that may be used to implement online media tagging techniques are disclosed in Blumenau, U.S. Pat. No. 6,108,637, which is hereby incorporated herein by reference in its entirety, in international patent application no. PCT/US11/52623, filed on Sep. 21, 2011, which is hereby incorporated herein by reference in its entirety, Burbank et al., U.S. Pat. No. 8,930,701, which is hereby incorporated herein by reference in its entirety, and Mazumdar et al., U.S. Pat. No. 8,370,489, which is hereby incorporated herein by reference in its entirety.

Producers of media interested in reach measures of their cross-platform media campaigns may obtain television impression information or television reach measurements from the TV measurement entity 108 and separately obtain digital impression information or digital reach measures from the total digital measurement entity 116. However, such separately collected measures contain overlapping audience members 120. In such examples, the TV measurement entity 108 tracks television campaign impressions for the panel audience members 110a, and the total digital measurement entity 116 separately tracks digital campaign impressions for its registered users, some of which overlap with the panel audience members 110a. As such, when the TV measurement entity 108 logs a television-based impression for a TV audience panel member 110a in connection with a particular media campaign, and the total digital measurement entity 116 logs a digital media-based impression in connection with the same media campaign for the same TV audience panel member 110a that happens to also be a registered user of the total digital measurement entity 116, the resulting television reach measure generated by the TV measurement entity 108 and the resulting digital reach measure generated by the total digital measurement entity 116 are based on duplicate impressions for the same audience members exposed to the same media campaigns, albeit via different media delivery types (e.g., television and digital platforms).

In the illustrated example, the TV measurement entity 108 is operated by the AME 102, and the total digital measurement entity 116 is a separate entity from the AME 102. In the illustrated example, the total digital measurement entity 116 does not share identifiers and/or user-level information of its registered users represented in the total digital user database 118 with the AME 102, and the AME 102 does not share identities and/or user-level information of its panel members represented in the databases 112, 114 with the total digital measurement entity 116. In some examples, to honor privacy policies, the AME 102 and the total digital measurement entity 116 do not share identities and/or user-level information about their audience members or registered users. As such, the television panel database 112, including the CPH panel database 114, is maintained separately from the total digital user database 118, and the AME maintained databases 112, 114 are not linked to the total digital user database 118. Because the AME maintained databases 112, 114 are not linked to the total digital user database 118 and the AME 102 and the total digital measurement entity 116 do not share audience member information and/or registered user information, traditional techniques for generating cross-platform media reach metrics do not eliminate duplicate audience member impressions resulting from the same audience members tracked for different media delivery types (e.g., platforms).

In the illustrated example of FIG. 1, the example AME 102 includes a duplication manager 130 to provide producers of cross-platform media (e.g., television and digital campaigns including advertisements and content) with reach measures of their media to unique television audience members 110a exposed to the television media via the television media access devices 104, and to unique Internet audience members exposed to the online media as measured using impressions collected by the Internet service database proprietor 122. To improve the accuracy of reach measures, the example duplication manager 130 determines a television audience reach (e.g., from the example TV metrics calculator 109) and a total digital audience reach (e.g., form the example total digital metrics calculator 117). As disclosed above, in some instances, audience members may be uniquely identified in each respective platform. For example, if a user watches an episode of "Comedy Show" during broadcast via a television media access device 104 and then re-watches the episode three days later via an online service, then traditional techniques for estimating total unique audience would (1) credit the episode with a first impression for TV exposure and a second impression for digital exposure, and (2) double-count the user in the total audience count of audience members exposed to the cross-platform media. Thus, adding the TV audience to the total digital audience does not accurately provide a total audience for the cross-platform media. To deduplicate total audience in cross-platform media campaigns, the example duplication manager 130 uses example Equation 3 below to calculate the deduplicated total audience (DDTA) for the cross-platform media.

$$DDTA = UE*(reach_{TV} + reach_{digital} - (reach_{TV} + reach_{digital})*DF) \qquad \text{Equation 3:}$$

In Equation 3 above, the deduplicated total audience (DDTA) represents the total number of unique audience members exposed to the cross-platform media campaign. In Equation 1 above, the variable ($reach_{TV}$) represents the duplicated television audience reach and the variable ($reach_{digital}$) represents the duplicated digital audience reach. The duplicated television audience reach ($reach_{TV}$) represents a percentage of a population (e.g., a universe estimate) who were exposed to the media campaign via at least television media delivery. Thus, the duplicated television audience reach ($reach_{TV}$) may also include a number of users who were also exposed to the digital media campaign and, therefore, may be duplicated (e.g., double-counted). The duplicated digital audience reach ($reach_{digital}$) represents a percentage of a population (e.g., a universe estimate) who were exposed to the media campaign via at least digital media delivery (e.g., via a mobile device, a PC, etc.). Thus, the duplicated digital audience reach ($reach_{digital}$) may also include a number of users who were also exposed to the media campaign via television media delivery and, therefore, may be duplicated (e.g., double-counted).

In Equation 3, the duplication factor (DF) represents an overlap between the duplicated television audience reach and the duplicated digital audience reach. As disclosed below in connection with the duplication manager 130 of FIG. 2, the duplication manager 130 may use Equation 4 below to calculate the duplication factor (DF).

$$DF = \frac{(-1 + ((OR - 1)*(reach_{TV} + reach_{digital})))}{2*(1 - OR)} + \frac{\sqrt{(1 + (OR - 1)*(reach_{TV} + reach_{digital}))^2 + 4(1 - OR)(OR*reach_{TV}*reach_{digital})}}{2*(1 - OR)} \qquad \text{Equation 4}$$

In Equation 4 above, the first example reach ($reach_{TV}$) represents a percentage of a population (e.g., a universe estimate) who were exposed to TV media via at least the TV platform (e.g., a duplicated television audience who were exposed to at least the television media campaign). In Equation 4 above, the second example reach ($reach_{digital}$) represents a percentage of a population (e.g., a universe estimate) who were exposed to digital media via at least the digital platform (e.g., a duplicated online audience who were exposed to at least the digital media campaign). In Equation 4 above, the overlap multiplier (OR) represents a ratio based on (1) a duplicated number of people who watched the media on both platforms, (2) a non-duplicated number of people who watched the media on the TV platform, (3) a non-duplicated number of people who watched the media on the digital platform, and (4) a number of people who did not watch the media at all. In the illustrated example, the overlap multiplier (OR) is an odds ratio. An example technique for determining the overlap multiplier (OR) is disclosed in connection with an example overlap calculator 210 of FIG. 2. However, other techniques for calculating an overlap multiplier may additionally or alternatively be used. For example, the duplication manager 130 may obtain the duplication factor (DF) from a deduplication factors repository, as disclosed in Spoentgen et al., U.S. patent application Ser. No. 15/338,301, which is hereby incorporated herein by reference in its entirety.

Although disclosed examples are described herein in connection with the AME 102 being the implementing entity of such disclosed examples, such disclosed examples may be implemented by the AME 102, by an entity implementing the TV measurement entity 108 separate from the AME 102, by an entity implementing the total digital measurement entity 116 separate from the AME 102, and/or by any other entity interested in generating media impression reports and/or reach metrics. In some examples, the TV measurement entity 108 and the total digital measurement entity 116 may be implemented by respective entities separate from the AME 102. In other examples, the AME 102 may implement one of the TV measurement entity 108 or the total digital measurement entity 116. In yet other examples, the AME 102 may include or be part of the total digital measurement entity 116.

Multi-platform media campaigns may often include double-counted audience members due to the audience measurement entity not knowing which unique members were exposed to multiple instances of the same media across multiple platforms. In some examples, the audience measurement entity knows which panelists are exposed to instances of cross-platform media. However, a panel is limited to those panelists who are enrolled, while non-panelists may represent the entire population of a country to acquire audience measurements of the entire population. Accordingly, the example methods and apparatus disclosed herein utilize panelist data in combination with census data (e.g., impression data that includes logged impression for the audience population being measured without regard to such audience including panelists or non-panelists) to estimate deduplicated unique audiences. The example duplication manager 130 utilizes audience metrics associated with the panelist data from the example CPH panel database 114 to determine an overlap multiplier (OR). In the illustrated example, the overlap multiplier (OR) is an odds ratio. The odds ratio is a measure of association that provides a way of increasing (or decreasing) an overlap percentage regardless of a change in the number of audience members exposed to the media campaign via one platform or both platforms. The example duplication manager 130 then calculates the duplication factor (DF) using the overlap multiplier (OR) and the audience reaches of the two platforms. For example, the duplication manager 130 may use Equation 4 above to calculate the duplication factor (DF). The duplication manager 130 then uses the duplication factor (DF) to calculate the deduplicated total audience (DDTA) of the cross-platform media campaign.

Figure 2:
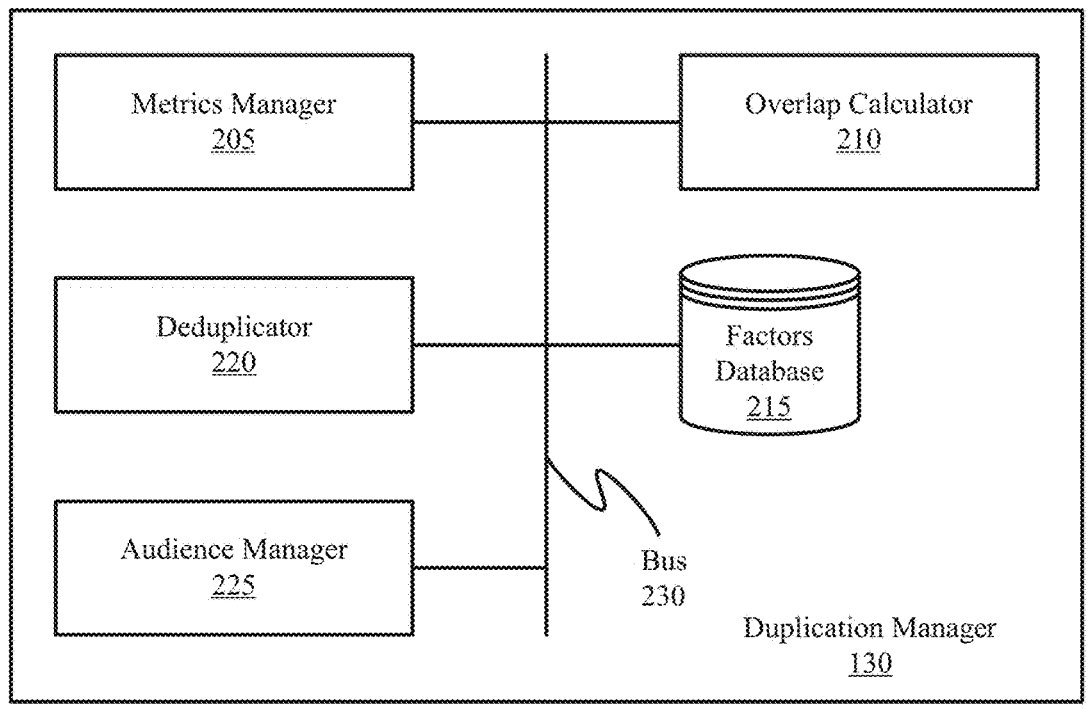
FIG. 2 is a block diagram of an example implementation of the example duplication manager of FIG. 1.

FIG. 2 is an example implementation of the duplication manager 130 of FIG. 1. The example duplication manager 130 of FIG. 2 includes an example metrics manager 205, an example overlap calculator 210, an example factors database 215, an example deduplicator 220, and an example audience manager 225. In the illustrated example of FIG. 2, the metrics manager 205, the example overlap calculator 210, the example factors database 215, the example deduplicator 220, and the example audience manager 225 are communicatively coupled (e.g., via a bus 230).

In the illustrated example of FIG. 2, the duplication manager 130 includes the example metrics manager 205 to manage metrics for cross-platform media campaigns. For example, the metrics manager 205 may obtain and record TV audience metrics for media campaigns from the example TV metrics calculator 109 of FIG. 1. The example metrics manager 205 may also obtain and record total digital audience metrics for digital media campaigns from the example total digital metrics calculator 117 of FIG. 1. In the illustrated example of FIG. 2, the audience metrics obtained and recorded by the metrics manager 205 are at the media hierarchy level. For example, the audience metrics for the program "Comedy Hour" may include audience reach at the episode level, at the program level, at the originator level, etc.

In the illustrated example of FIG. 2, the duplication manager 130 includes the example overlap calculator 210 to determine overlap multipliers at different media hierarchy×genre levels. For example, the overlap calculator 210 may determine an overlap multiplier for comedies at the episode level, comedies at the program level, comedies at the originator level, dramas at the episode level, etc. In some examples, the overlap calculator 210 obtains the overlap multipliers from a source such a deduplication factors repository. An example implementation of obtaining overlap multipliers from a deduplication factors repository is disclosed in Spoentgen et al, U.S. patent application Ser. No. 15/338,301, which is hereby incorporated herein by reference.

In the illustrated example, the overlap calculator 210 calculates the overlap multipliers using historical data from the CPH panel database 114. As disclosed above, the CPH panel database 114 includes panelist data for users who are included in the TV panel database 112 and the total digital user database 118. The example overlap calculator 210 aggregates data from the CPH panel database 114 over a period (e.g., six months) and then determines the overlap multipliers at the media hierarchy×genre level. For example, the overlap calculator 210 may generate 2×2 matrices at the media hierarchy×genre level based on TV audience reach and total digital audience reach. An example 2×2 matrix is shown in Table 1 below for comedies at the episode level.

TABLE 1

|  | TV = Yes | TV = No |  |
|---|---|---|---|
| Digital = Yes | $X_{11}$ | $X_{01}$ | $Reach_{Digital} = X_{11} + X_{01}$ |
| Digital = No | $X_{10}$ $Reach_{TV} = X_{11} + X_{10}$ | $X_{00}$ |  |

In the illustrated example of Table 1, the first column represents audience reach associated with exposure to media via the TV platform and the second column represents audience reach associated with no exposure to media via the TV platform. The first row of the example Table 1 represents audience reach associated with exposure to digital media via the digital platforms and the second row represents audience reach associated with no exposure to digital media via the digital platforms.

In the illustrated example of Table 1, a first variable ($X_{11}$) represents a panel duplication reach. For example, the overlap calculator 210 may determine the panel duplication reach ($X_{11}$) using Equation 5 below.

$$X_{11} = \frac{\text{Audience}_{Duplicated\_Panel}}{UE} \qquad \text{Equation 5}$$

In Equation 5 above, the panel duplication reach ($X_{11}$) is determined as a ratio of (1) the number of audience members who were exposed to media via the TV platform and the digital platforms (Audience$_{Duplicated\_Panel}$) and (2) the estimated universe (UE). The example overlap calculator 215 of FIG. 2 may obtain the number of audience members who were exposed to media via the TV platform and the digital platforms from the metrics manager 205.

In the illustrated example of Table 1, a second variable ($X_{10}$) represents a deduplicated panel reach for the first platform. For example, the overlap calculator 210 may determine the deduplicated panel reach for the TV platform ($X_{10}$) using Equation 6 below.

$$X_{10} = \frac{\text{Audience}_{TV}}{UE} \qquad \text{Equation 6}$$

In Equation 6 above, the deduplicated panel reach for the TV platform ($X_{10}$) is determined as a ratio of (1) the number of audience members who were exposed to the media using only the TV platform (Audience$_{TV}$) and (2) the estimated universe (UE). The example overlap calculator 210 of FIG. 2 may obtain the number of audience members who were exposed to the media using only the TV platform (Audience$_{TV}$) from the metrics manager 205 and/or the TV measurement entity 108.

In the illustrated example of Table 1 above, a third variable ($X_{01}$) represents a deduplicated panel reach for the digital platform. For example, the overlap calculator 210 may determine the deduplicated panel reach for the digital platforms ($X_{01}$) using Equation 7 below.

$$X_{01} = \frac{\text{Audience}_{digital}}{UE} \qquad \text{Equation 7}$$

In Equation 7 above, the deduplicated panel reach for the digital platforms ($X_{01}$) is determined as a ratio of (1) the number of audience members who were exposed to the media using only the digital platforms (Audience$_{digital}$) and (2) the estimated universe (UE). The example overlap calculator 210 of FIG. 2 may obtain the number of audience members who were exposed to the media using only the digital platforms (Audience$_{digital}$) from the metrics manager 205 and/or the total digital measurement entity 116.

In the illustrated example of Table 1, a fourth variable ($X_{00}$) represents a number of audience members who did not view the media program at all (e.g., were included in neither the TV platform audience nor the total digital platform audience). For example, the overlap calculator 210 may determine the did-not-view reach ($X_{00}$) using Equation 8 below.

$$X_{00} = \frac{UE - (\text{Audience}_{TV}) - (\text{Audience}_{digital}) - (\text{Audience}_{Duplicated\_Panel})}{UE} \qquad \text{Equation 8}$$

In Equation 8 above, the did-not-view reach ($X_{00}$) is determined as a ratio of (1) the number of audience members who were not included in the TV audience (Audience$_{TV}$), the total digital audience (Audience$_{digital}$) and the duplicated panel audience (Audience$_{Duplicated\_Panel}$) and (2) the estimated universe (UE). The example overlap calculator 210 of FIG. 2 may obtain the TV audience (Audience$_{TV}$), the total digital audience (Audience$_{digital}$) and the duplicated panel audience (Audience$_{Duplicated\_Panel}$) from the metrics manager 205, the TV measurement entity 108 and/or the total digital measurement entity 116.

In some examples, the calculations performed by the overlap calculator 210 are performed separately for each demographic group (e.g., each demographic bucket). In some examples, to simplify the formula, the superscript "(d)" (which represents a demographic group (d)) is ignored in all notations. For example, instead of audience reach (reach$_{TV}^d$), audience reach (reach$_{TV}$) is used to represent audience reach within demographic group (d) of the TV platform.

In the illustrated example, the overlap calculator 210 applies the panel duplication reach ($X_{11}$), the deduplicated panel reach for the TV platform ($X_{10}$), the deduplicated panel reach for the digital platforms ($X_{01}$), and the did-not-view reach ($X_{00}$) variables (also referred to herein as "odds ratio factors") to Equation 9 to calculate the overlap multiplier (OR) between the TV audience and the digital audience based on panelist information.

$$OR = \frac{X_{11} * X_{00}}{X_{01} * X_{10}} \qquad \text{Equation 9}$$

To solve Equation 9 the example overlap calculator 210 determines the odds ratio factors ($X_{11}$), ($X_{10}$), ($X_{01}$), ($X_{00}$) using Equations 5-8. In the illustrated example, the overlap calculator 210 calculates the overlap multipliers (OR) at the media hierarchy×genre level. The example overlap calculator 210 records the calculated overlap multipliers in the example factors database 215.

The example factors database 215 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example factors database 215 may additionally or alternatively be implemented by one or more double data rate (DDR) memories, such as DDR, DDR2, DDR3, mobile DDR (mDDR), etc. The example factors database 215 may additionally or alternatively be implemented by one or more mass storage devices such as hard disk drive(s), compact disk drive(s), digital versatile disk drive(s), etc. While in the illustrated example the factors database 215 is illustrated as a single database, the factors database 215 may be implemented by any number and/or type(s) of databases.

In the illustrated example of FIG. 2, the ratings manager 130 includes the example deduplicator 220 to calculate a duplication factor used by the example audience manager 225 to calculate a deduplicated total audience (DDTA) for a cross-platform media campaign. The example deduplicator 220 uses Equation 4 (reproduced below for convenience) to calculate the duplication factor (DF).

$$DF = \frac{(-1 + ((OR - 1) * (\text{reach}_{TV} + \text{reach}_{digital})))}{2 * (1 - OR)} + \qquad \text{Equation 4}$$

$$\frac{\sqrt{(1+(OR-1)*(\text{reach}_{TV}+\text{reach}_{digital}))^2 + 4(1-OR)(OR*\text{reach}_{TV}*\text{reach}_{digital})}}{2*(1-OR)}$$

In Equation 4 above, the example TV audience reach ($\text{reach}_{TV}$) represents a percentage of a population (e.g., a universe estimate) who were exposed to media via at least the TV platform (e.g., a duplicated television audience who were exposed to at least the television media campaign). In Equation 4 above, the example digital audience reach ($\text{reach}_{digital}$) represents a percentage of a population (e.g., a universe estimate) who were exposed to at least media via at least the digital platforms (e.g., a duplicated digital audience who were exposed to at least the digital media campaign). In the illustrated example, the deduplicator 220 obtains the first example reach ($\text{reach}_{TV}$) and the second example reach ($\text{reach}_{digital}$) from the metrics manager 205.

In Equation 4 above, the overlap multiplier (OR) is an odds ratio that is determined by the example overlap calculator 210. As shown above, the overlap calculator 210 determines the overlap multiplier (OR) based on knowledge of (1) a duplicated number of people who watched media on two platforms ($X_{11}$), (2) a non-duplicated number of people who watched the media on only the TV platform ($X_{10}$), (3) a non-duplicated number of people who watched the media on only the digital platforms ($X_{01}$), and (4) a number of people who did not watch the media at all ($X_{00}$). Thus, the overlap calculator 210 determines the overlap multiplier (OR) using panelist data from the CPH panel database 114, from which the four odds ratio factors ($X_{11}$), ($X_{10}$), ($X_{01}$), ($X_{00}$) can be determined.

In contrast, the deduplicator 220 determines the duplication factor (DF) for a cross-platform media campaign without knowledge of the four odds ratio factors ($X_{11}$), ($X_{10}$), ($X_{01}$), ($X_{00}$). For example, the audience reaches ($\text{reach}_{TV}$), ($\text{reach}_{digital}$) provided by the metrics manager 205 correspond to deduplicated audience reaches within the respective platforms. However, the audience reaches do not include identities of audience members who viewed the media via only one platform or the other platform. Thus, the example deduplicator 220 determines the duplication factor (DF) to estimate the duplicated audience across the TV platform and the total digital platform. To select the correct overlap multiplier (OR) to apply to Equation 4, the example deduplicator 220 determines (e.g., maps) a genre of the media campaign (e.g., comedy, drama, news, etc.). The example deduplicator 220 then obtains the overlap multiplier (OR) corresponding to the media hierarchy level (e.g., episode, program, originator, etc.) based on the determined genre of the media campaign.

In the illustrated example of FIG. 2, the duplication manager 130 includes the audience manager 225 to estimate a deduplicated total audience (DDTA) for a cross-platform media campaign. The example audience manager 225 of FIG. 2 applies Equation 3 (reproduced below for convenience) to calculate the DDTA.

$$\text{DDTA}=UE*(\text{reach}_{TV}+\text{reach}_{digital}-(\text{reach}_{TV}+\text{reach}_{digital})*DF) \quad \text{Equation 3:}$$

In Equation 3 above, the audience manager 225 determines the deduplicated total audience (DDTA) based on a total audience reach of the TV platform ($\text{reach}_{TV}$), a total audience reach of the digital platforms ($\text{reach}_{digital}$) and a duplicated audience between the TV platform and the total digital platforms (($\text{reach}_{TV}+\text{reach}_{digital}$)*DF). The example audience manager 225 multiplies the difference of the duplicated audience and the total audience reaches by a universe estimate (UE) (e.g., the population of an audience to be measured) to calculate the deduplicated total audience (DDTA).

In operation, the example duplication manager 130 determines the platforms included in a cross-platform media campaign. For example, the duplication manager 130 may determine that a cross-platform media campaign includes a TV platform, a digital TV (DTV) platform and a digital content ratings (DCR) platform. The example duplication manager 130 communicates the identified platforms to the metrics manager 205. The example metrics managers 205 determines metrics, such as, for example, reach for the identified platforms. The example metrics manager 205 may calculate the metrics for panelists and for non-panelists. The example overlap calculator 210 utilizes the metrics provided by the metrics manager 205 to determine the overlap multiplier (OR) for panelist data using the CPH panel database. For example, the overlap calculator 210 may use Equation 4 (above) to calculate the overlap multiplier (OR). The example deduplicator 220 uses metrics provided by the metrics manager 205 and the overlap multiplier (OR) provided by the overlap calculator 210 to determine a duplication factor (DF). For example, the deduplicator 220 may use Equation 2 above to calculate the duplication factor (DF) between two platforms. The example audience manager 225 determines a deduplicated total audience by removing the duplicated audience from a total audience. For example, the audience manager 225 may use Equation 1 (above) to calculate the deduplicated total audience (DDTA) for the two platforms. The example duplication manager 130 may then repeat this operation for another pair of platforms in a subsequent iteration (e.g., a roll-up). For example, the duplication manager 130 may calculate a deduplicated total audience for the DTV platform and the DCR platform (e.g., a digital platform) during a first iteration, and then perform the operation using the TV platform and the digital platform during a second iteration to calculate the DDTA for the cross-platform media campaign including the TV platform, the DTV platform and the DCR platform.

While an example manner of implementing the duplication manager 130 of FIG. 1 is illustrated in FIG. 2, one or more of the elements, processes, and/or devices illustrated in FIG. 2 may be combined, divided, re-arranged, omitted, eliminated and/or implemented in any other way. Further, the example metrics manager 205, the example overlap calculator 210, the example factors database 215, the example deduplicator 220, and the example audience manager 225 and/or, more generally, the example ratings manager 130 of FIG. 1 may be implemented by hardware, software, firmware and/or any combination of hardware, software and/or firmware. Thus, for example, any of the example metrics manager 205, the example overlap calculator 210, the example factors database 215, the example deduplicator 220, and the example audience manager 225 and/or, more generally, the example duplication manager 130 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example metrics manager 205, the example overlap calculator 210, the example factors database 215, the example deduplicator 220, and the example audience manager 225 and/or, more generally, the example duplication manager 130 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example duplication manager 130 of FIG. 1 may include one or more elements, processes and/or devices in addition to, or instead of, those illustrated in FIG. 2, and/or may include more than one of any or all of the illustrated elements, processes and devices.

Figure 3:
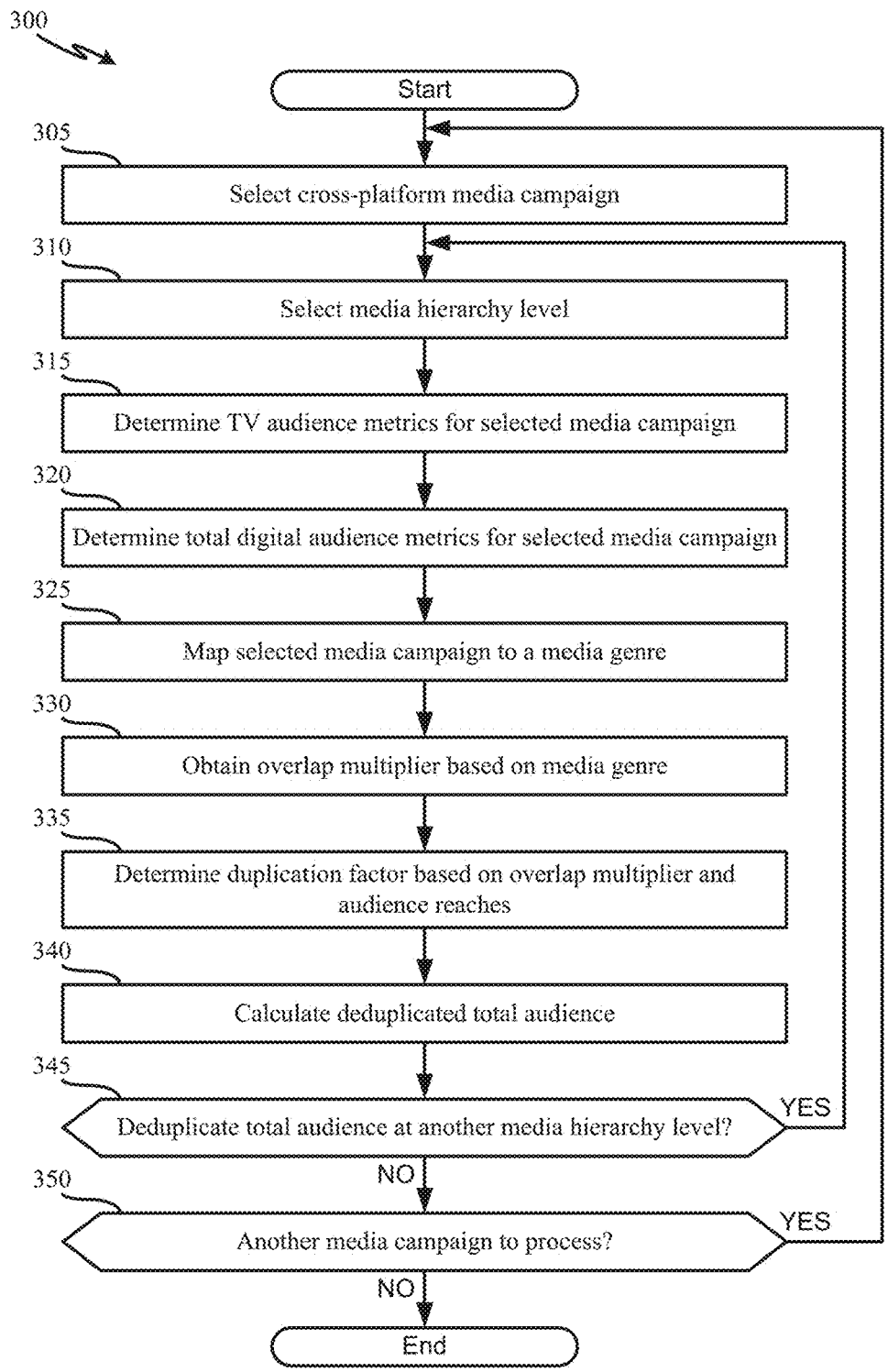
FIGS. 3 and/or 4 are flowcharts representative of example computer readable instructions that may be executed by the processing platform of FIG. 5 to implement the example duplication manager of FIG. 1 and/or FIG. 2.
Figure 4:
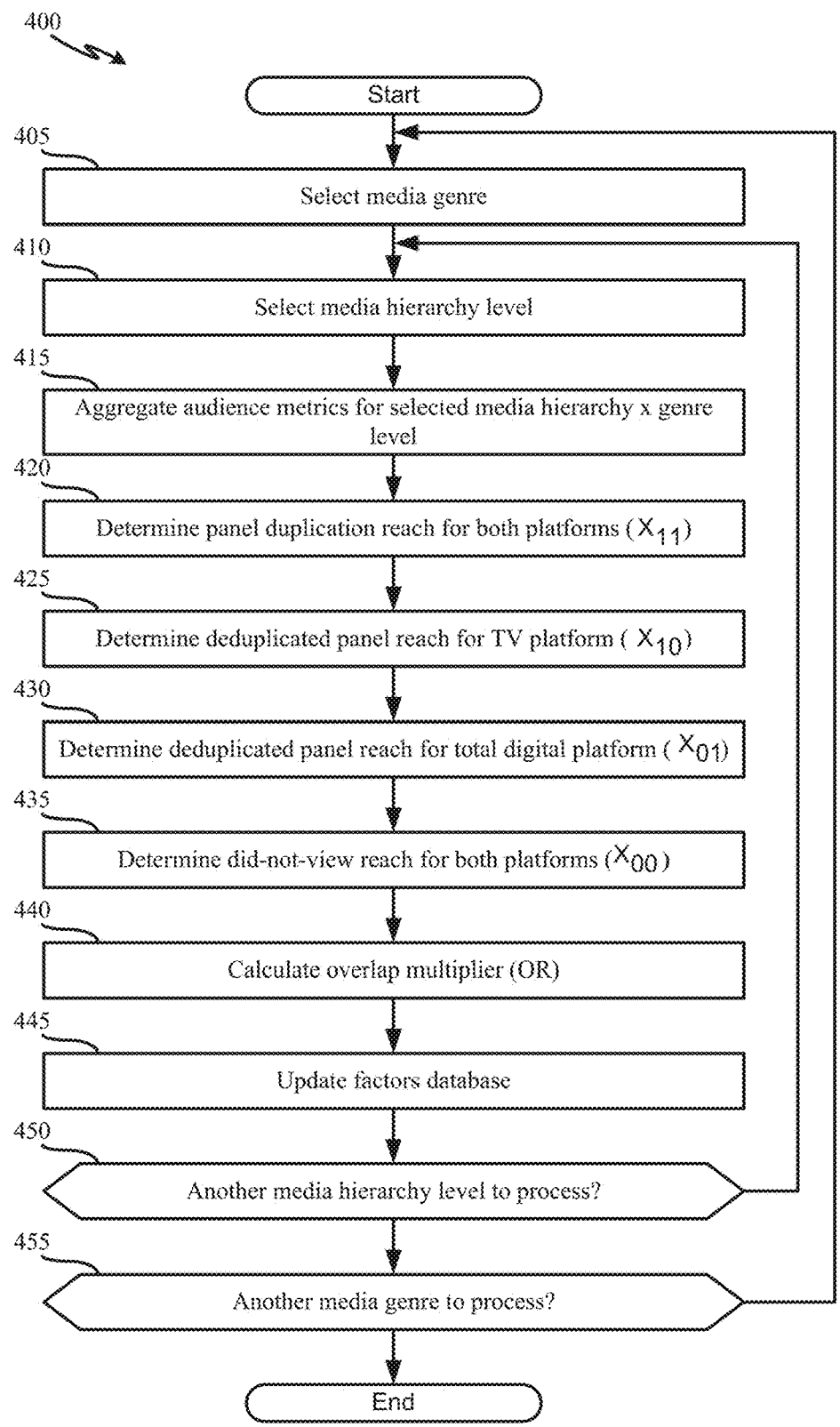

Flowcharts representative of example machine readable instructions for implementing the example duplication manager 130 of FIGS. 1 and/or 2 are shown in FIGS. 3 and 4. In these examples, the machine readable instructions comprise a program for execution by a processor such as the processor 512 shown in the example processor platform 500 discussed below in connection with FIG. 5. The program may be embodied in software stored on a tangible computer readable storage medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 4, many other methods of implementing the example duplication manager 130 may alternatively be used. For example, the order of execution of the blocks may be changed, and/or some of the blocks described may be changed, eliminated, or combined.

As mentioned above, the example processes of FIGS. 3 and/or 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3 and/or 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

FIG. 3 is a flowchart representative of example computer-readable instructions 300 to implement the example duplication manager 130 of FIG. 1 and/or FIG. 2 to estimate deduplicated total audiences for cross-platform media campaigns. The example program 300 of FIG. 3 begins at block 305 when the example duplication manager 130 selects a cross-platform media campaign to process. At block 310, the example duplication manager 130 selects a media hierarchy level (e.g., episode level, program level, originator level, etc.) at which to perform the deduplication.

At block 315, the example duplication manager 130 determines TV audience metrics for the selected media campaign at the selected media hierarchy level. For example, the example metrics manager 205 (FIG. 2) may obtain TV audience metrics for the selected media campaign from the TV measurement entity 108 (FIG. 1).

At block 320, the example duplication manager 130 determines total digital audience metrics for the selected media campaign at the selected media hierarchy level. For example, the example metrics manager 205 (FIG. 2) may obtain total digital audience metrics for the selected media campaign from the total digital measurement entity 116 (FIG. 1).

As an illustrative example, an example Table 2 below illustrates audience reaches associated with the TV platform and the total digital platform provided by the example metrics manager 205 at the episode level.

TABLE 2

|  | TV = Yes | TV = No | |
| --- | --- | --- | --- |
| Total Digital = Yes | $X_{11}$ = ? | $X_{01}$ = ? | $Reach_{digital}$ = 0.3 |
| Total Digital = No | $X_{10}$ = ? | $X_{00}$ = ? | |
|  | $Reach_{TV}$ = 0.6 | Population = UE = 1000 people | |

In the example Table 2 above, the duplicated audience reaches for the TV platform ($Reach_{TV}$) and the total digital platform ($Reach_{digital}$) are provided by the metrics manager 205 based on, for example, the number of impressions for media associated with the TV platform and the total digital platform, respectively, within the population of an audience to be measured (UE=1000). However, because the impressions include panelists (e.g., from the TV measurement entity 108) and non-panelists (e.g., census impressions from the total digital measurement entity 116), the example metrics manager 205 is unable to provide granular metrics, such as, for example, (1) the number of audience members who were exposed to the media campaign via the TV platform and the total digital platforms, (2) the number of audience members who were exposed to the media campaign via the TV platform and not the total digital platform, (3) the number of audience members who were exposed to the media campaign via the total digital platform and not the TV platform, and (4) the number of people within the population to be measured who were not exposed to the media campaign.

At block 325, the example duplication manager 130 maps the media campaign to a media genre. For example, the example deduplicator 220 determines a media genre (e.g., comedy, drama, news, etc.) associated with the media.

At block 330, the example duplication manager 130 obtains an overlap multiplier (OR) based on the media genre. For example, the deduplicator 220 may obtain the overlap multiplier (OR) from the example factors database 215 (FIG. 2). In some examples, the factors database 215 is populated with overlap multipliers by, for example, a third-party provider. In some examples, the factors database 215 is populated with overlap multipliers based on calculations performed by the example overlap calculator 210. An example implementation of calculating the overlap multipliers is disclosed below in connection with FIG. 4. An illustrative example described below is based on the deduplicator 220 retrieving an overlap multiplier (OR) of 0.375.

At block 335, the example duplication manager 130 determines the duplication factor (DF) for the media campaign based on the duplicated reach values (e.g., the duplicated TV reach values and the duplicated total digital reach values) obtained from the example metrics manager 205. For example, the example deduplicator 220 may apply Equation 4 (reproduced with example values below) to calculate the duplication factor (DF).

$$DF = \frac{(-1 + ((0.375 - 1) * (0.6 + 0.3)))}{2 * (1 - 0.375)} + \frac{\sqrt{(1 + (0.375 - 1) * (0.6 + 0.3))^2 + 4(1 - 0.375)(0.375 * 0.6 * 0.3)}}{2 * (1 - 0.375)}$$

Equation 4

In the illustrated example, the deduplicator 220 applies the duplicated audience reach values (e.g., $Reach_{TV}$=0.6 and $Reach_{digital}$=0.3) in Table 2 and the overlap multiplier (OR=0.375) to Equation 4 above to determine that the duplication factor (DF) is 0.13.

At block 345, the example duplication manager 130 calculates the deduplicated total audience (DDTA) across the TV and total digital platforms for the selected media campaign at the selected media hierarchy level (e.g., episode level, program level, originator level, etc.). For example, the example audience manager 225 (FIG. 2) may apply Equation 3 (reproduced with example values below) to calculate the deduplicated total audience (DDTA) across the TV platform and the total digital platform.

DDTA=1000*(0.6+0.3−(0.6+0.3)*0.13)=782 people    Equation 3:

In the illustrated example, the audience manager 225 determines the deduplicated total audience (DDTA) based on a total audience of the TV platform (UE*$reach_{TV}$=1000*0.6=600 people), a total audience of the total digital platform (UE*$reach_{digital}$=1000*0.3=300 people) and a duplicated audience between the TV platform and the total digital platforms (UE*($reach_{TV}$+$reach_{digital}$)* DF=1000*(0.6+0.3)*0.13=118 people). The example audience manager 225 subtracts the duplicated audience (e.g., 118) from the total audience (e.g., 600+300=900) to determine the deduplicated total audience (DDTA) for the TV and total digital platforms (e.g., 900−118=782) at the selected media hierarchy level.

At block 345, the example duplication manager 130 determines whether there is another media hierarchy level to process. For example, the duplication manager 130 may determine to estimate the deduplicated total audience (DDTA) for the media campaign at the program level, the originator level, etc. If, at block 345, the duplication manager 130 determines that there is another media hierarchy level to process, control returns to block 310 to select another media hierarchy level.

If, at block 345, the duplication manager 130 determines that there is not another media hierarchy level to process, then, at block 350, the duplication manager 130 determines whether there is another media campaign to process. If, at block 350, the duplication manager 130 determines that there is another media campaign to process, control returns to block 305 to select another media campaign. If, at block 350 the duplication manager 130 determines that there is not another media campaign to process, the example program 300 of FIG. 3 then ends.

Although not shown in the example program 300 of FIG. 3, in some examples, the duplication manager 130 may perform the operations of program 300 to estimate the deduplicated total audience (DDTA) for different demographic groups. For example, after block 310, the example duplication manager 130 may select a demographic group (e.g., males 18-34, females 18-34, males 35-44, females 35-44, etc.) to process. In some such examples, the example metrics manager 205 may determine the audience metrics at selected media hierarchy×demographics level. The operations of blocks 315, 320, 325, 330, 335, 340 may then be repeated for different media hierarchy×demographics levels.

FIG. 4 is a flowchart representative of example computer-readable instructions 400 to implement the example duplication manager 130 of FIG. 1 and/or FIG. 2 to calculate the overlap multiplier (OR) for a plurality of media hierarchy× genre levels based on panelist information. In the illustrated example, the overlap multiplier (OR) is an odds ratio. The example program 400 of FIG. 4 begins at block 405 when the example duplication manager 130 selects a media genre (e.g., comedy, drama, news, etc.) to process. At block 410, the example duplication manager 130 selects a media hierarchy level (e.g., episode, program, originator, etc.) to process. At block 415, the example duplication manager 130 aggregates audience metrics for the selected media hierarchy×genre level. For example, the example metrics manager 205 may obtain TV audience metrics (e.g., TV audience size, TV reach, etc.) from the TV measurement entity 108 and total digital audience metrics (e.g., total digital audience size, total digital reach, etc.) from the total digital measurement entity 116 for the selected media hierarchy×genre level. The example metrics manager 205 may then aggregate the obtained audience metrics for a period (e.g., six months). In the illustrated example, the audience metrics aggregated by the metrics manager 205 are based on panelist information included in the example CPH panel database 114. Example Table 3 illustrates example metrics that may be aggregated by the metrics manager 205 for the comedy genre at the episode level over a six month period.

TABLE 3

| | |
|---|---|
| Duplicated Audience ($Audience_{Duplicated\_Panel}$) | 1000 people |
| Deduplicated TV Audience ($Audience_{TV}$) | 4000 people |
| Deduplicated Total Digital Audience ($Audience_{digital}$) | 2000 people |
| Universe Estimate (UE) | 10000 people |

At block 420, the example duplication manager 130 determines the panel duplication reach for TV and total digital platforms ($X_{11}$). For example, the overlap calculator 210 may use Equation 5 (reproduced below with example values) to calculate the panel duplication reach for the TV and total digital platforms ($X_{11}$).

$$X_{11} = \frac{\text{Audience}_{Duplicated\_Panel}}{UE} = \frac{1000}{10000} = 0.1 \qquad \text{Equation 5}$$

In the illustrated example, the overlap calculator 210 applies the duplicated panel audience (1000) and the universe estimate (10000) to Equation 5 to determine the panel duplication reach for the selected platforms ($X_{11}$=0.1).

At block 425, the example duplication manager 130 determines the deduplicated panel reach for the TV platform ($X_{10}$). For example, the overlap calculator 210 may use Equation 6 (reproduced below with example values) to calculate the deduplicated panel reach for the TV platform ($X_{10}$).

$$X_{10} = \frac{\text{Audience}_{TV}}{UE} = \frac{4000}{10000} = 0.4 \qquad \text{Equation 6}$$

In the illustrated example, the overlap calculator 210 applies the deduplicated TV audience (4000) and the universe estimate (10000) to Equation 6 to determine the deduplicated panel reach for the TV platform ($X_{10}$=0.4).

At block 430, the example duplication manager 130 determines the deduplicated panel reach for the total digital platform ($X_{01}$). For example, the overlap calculator 210 may use Equation 7 (reproduced below with example values) to calculate the deduplicated panel reach for the total digital platform ($X_{01}$).

$$X_{01} = \frac{\text{Audience}_{digital}}{UE} = \frac{2000}{10000} = 0.2 \qquad \text{Equation 7}$$

In the illustrated example, the overlap calculator 210 applies the deduplicated total digital audience (2000) and the universe estimate (10000) to Equation 7 to determine the deduplicated panel reach for the total digital platform ($X_{01}$=0.2).

At block 435, the example duplication manager 130 determines the did-not-view reach for the selected platforms ($X_{00}$). For example, the overlap calculator 210 may use Equation 8 (reproduced below with example values) to calculate the did-not-view reach for the TV and total digital platforms ($X_{00}$).

$$X_{00} = \frac{UE - (\text{Audience}_{TV}) - (\text{Audience}_{digital}) - (\text{Audience}_{Duplicated\_Panel})}{UE} \qquad \text{Equation 8}$$
$$= \frac{10000 - 1000 - 4000 - 2000}{10000}$$
$$= 0.3$$

In the illustrated example, the overlap calculator 210 applies the duplicated panel audience (1000), the deduplicated TV audience (4000), the deduplicated total digital audience (2000) and the universe estimate (10000) to Equation 8 to determine the did-not-view reach ($X_{00}$) for the TV and total digital platforms ($X_{00}$=0.3).

At block 440, the example duplication manager 130 determines the overlap multiplier (OR) for the TV and total digital platforms based on the panelist information. For example, the overlap calculator 210 applies the odds ratio factors ($X_{11}$), ($X_{10}$), ($X_{01}$), ($X_{00}$) to Equation 9 (reproduced with example values below) to calculate the overlap multiplier (OR) for the selected media hierarchy×genre level over a six month period.

$$OR = \frac{X_{11} * X_{00}}{X_{01} * X_{10}} = \frac{0.1 * 0.3}{0.2 * 0.4} = 0.375 \qquad \text{Equation 9}$$

In the illustrated example, the overlap calculator 210 applies the odds ratio factors ($X_{11}$=0.1), ($X_{10}$=0.4), ($X_{01}$=0.2), ($X_{00}$=0.3) to Equation 9 to determine the overlap multiplier (OR) for the selected media hierarchy×genre level over a six month period.

At block 445, the overlap calculator 210 updates the factors database 215 (FIG. 2). For example, the overlap calculator 210 records the calculated overlap multiplier (OR) for the selected media hierarchy×genre level in the factors database 215. At block 450, the example duplication manager 130 determines whether there is another media hierarchy level to process. For example, the duplication manager 130 may determine to calculate an overlap multiplier at the program level, the originator level, etc. If, at block 450, the duplication manager 130 determines that there is another media hierarchy level to process, control returns to block 410 to select another media hierarchy level.

If, at block 450, the duplication manager 130 determines that there is not another media hierarchy level to process, then, at block 455, the duplication manager 130 determines whether there is another media genre to process. For example, the duplication manager 130 may determine to calculate an overlap multiplier dramas, news programs, etc. If, at block 455, the duplication manager 130 determines that there is another media genre to process, control returns to block 405 to select another media genre. If, at block 455 the duplication manager 130 determines that there is not another media genre to process, the example program 400 of FIG. 4 then ends.

In some examples, the duplication manager 130 may perform the operations of program 400 to calculate overlap multipliers (OR) for different demographic groups. For example, after block 410, the example duplication manager 130 may select a demographic group (e.g., males 18-34, females 18-34, males 35-44, females 35-44, etc.) to process. In some such examples, the example metrics manager 205 may aggregate the audience metrics for the selected media hierarchy×genre×demographics level. The operations of blocks 420, 425, 430, 435, 440, 445 may then be repeated for different media hierarchy×genre×demographics levels.

Figure 5:
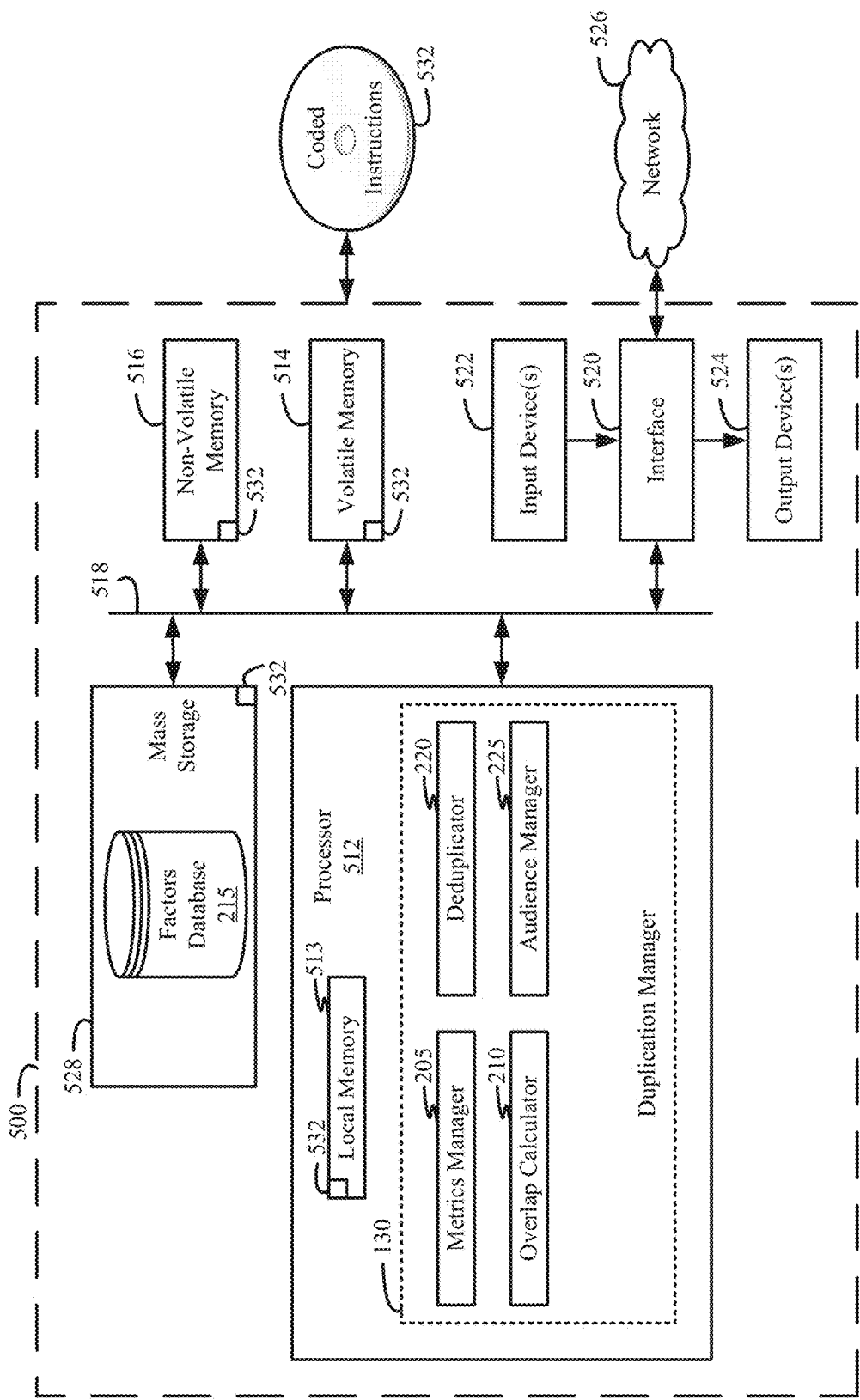
FIG. 5 is a block diagram of an example processing platform capable of executing the example machine-readable instructions of FIGS. 3 and/or 4 to implement the example duplication manager of FIG. 1 and/or FIG. 2.

FIG. 5 is a block diagram of an example processor platform 500 capable of executing the instructions of FIG. 3 and/or FIG. 4 to implement the duplication manager 130 of FIG. 1 and/or FIG. 2. The processor platform 500 can be, for example, a server, a personal computer, or any other type of computing device.

The processor platform 500 of the illustrated example includes a processor 512. The processor 512 of the illustrated example is hardware. For example, the processor 512 can be implemented by one or more integrated circuits, logic circuits, microprocessors or controllers from any desired family or manufacturer.

The processor 512 of the illustrated example includes a local memory 513 (e.g., a cache). The processor 512 of the illustrated example executes the instructions to implement the example metrics manager 205, the example overlap calculator 210, the example deduplicator 220 and/or the example audience manager 225. The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives. The example mass storage 528 implements the example factors database 215.

Coded instructions 532 represented by the flowcharts of FIG. 3 and/or FIG. 4 may be stored in the mass storage device 528, in the volatile memory 514, in the non-volatile memory 516, and/or on a removable tangible computer readable storage medium such as a CD or DVD.

From the foregoing, it will be appreciated that the above disclosed methods, apparatus and articles of manufacture facilitate estimating deduplicated total audiences for cross-platform media campaigns. Disclosed examples determine metrics, such as audience size, reach, etc. for the TV platform and the total digital platforms. In some examples, the metrics are determined based on panelist information (e.g., from the CPH panel database). In some examples, the metrics are determined based on panelist and non-panelist (e.g., census) information. Disclosed examples utilize the determined metrics to determine an overlap multiplier from panelist information. Disclosed examples also use the determined metrics for panelists and non-panelists and an overlap multiplier corresponding to the media campaign to determine a deduplication factor representing an overlap between the TV and total digital platforms. The above-disclosed methods, apparatus and articles of manufacture deduplicate total audience across the TV and total digital platforms to report accurate audience measurements.

It is noted that this patent claims priority from U.S. Provisional Patent Application Ser. No. 62/261,253, which was filed on Nov. 30, 2015, and is hereby incorporated herein by reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to estimate deduplicated total audience for a media campaign, the apparatus comprising:
a metrics manager to:
determine a first audience reach for a television audience, the television audience representative of audience members exposed to the media campaign via television media delivery; and
determine a second audience reach for a digital audience, the digital audience representative of audience members exposed to the media campaign via digital media delivery;
determine a first audience size for a second television audience, the second television audience representative of panelists exposed to a plurality of television campaigns associated with a media genre;
determine a second audience size for a second digital audience, the second digital audience representative of panelists exposed to a plurality of digital campaigns associated with the media genre; and
determine a third audience size for a duplicated audience, the duplicated audience representative of panelists exposed to the plurality of television campaigns and the plurality of digital campaigns associated with the media genre;
an overlap calculator to:
determine a television panel reach based on the first audience size and a panelist population based on the media genre;
determine a digital panel reach based on the second audience size and the panelist population;
determine a panel duplication reach based on the third audience size and the panelist population; and
determine a did-not-view reach based on the first audience size, the second audience size, the third audience size and the panelist population;
a deduplicator to:
obtain an overlap multiplier from a factors database based on the media campaign, the overlap multiplier is an odds ratio; and
determine a duplication factor for the media campaign based on the first audience reach, the second audience reach and the overlap multiplier; and
an audience manager to determine a total audience for the media campaign based on the first audience reach, the second audience reach and the duplication factor, at least one of the metrics manager, the overlap calculator, the deduplicator or the audience manager implemented by a logic circuit.

2. The apparatus as defined in claim 1, wherein the digital media delivery includes at least a digital television platform or a digital content ratings platform.

3. The apparatus as defined in claim 1, wherein the metrics manager is to determine the first audience reach at a media hierarchy level associated with at least an episode, a program or an originator.

4. The apparatus as defined in claim 1, wherein the deduplicator is to obtain the overlap multiplier based on the media genre.

5. The apparatus as defined in claim 1, wherein the overlap calculator is to determine the overlap multiplier as a ratio of (1) a product of the panel duplication reach and the did-not-view reach and (2) a product of the television panel reach and the digital panel reach.

6. A method to estimate deduplicated total audience for a media campaign, the method comprising:
   determining, by executing an instruction with a processor, a first audience reach for a television audience, the television audience representative of audience members exposed to the media campaign via television media delivery;
   determining, by executing an instruction with the processor, a second audience reach for a digital audience, the digital audience representative of audience members exposed to the media campaign via digital media delivery;
   determining a first audience size for a second television audience, the second television audience representative of panelists exposed to a plurality of television campaigns associated with a media genre;
   determining a second audience size for a second digital audience, the second digital audience representative of panelists exposed to a plurality of digital campaigns associated with the media genre;
   determining a third audience size for a duplicated audience, the duplicated audience representative of panelists exposed to the plurality of television campaigns and the plurality of digital campaigns associated with the media genre;
   determining a television panel reach based on the first audience size and a panelist population based on the media genre;
   determining a digital panel reach based on the second audience size and the panelist population;
   determining a panel duplication reach based on the third audience size and the panelist population;
   determining a did-not-view reach based on the first audience size, the second audience size, the third audience size and the panelist population;
   selecting, by executing an instruction with the processor, an overlap multiplier from a factors database based on the media campaign, the overlap multiplier is an odds ratio;
   determining, by executing an instruction with the processor, a duplication factor for the media campaign based on the first audience reach, the second audience reach and the overlap multiplier; and
   determining, by executing an instruction with the processor, a total audience for the media campaign based on the first audience reach, the second audience reach and the duplication factor.

7. The method as defined in claim 6, wherein the digital media delivery includes at least a digital television platform or a digital content ratings platform.

8. The method as defined in claim 6, further including determining the first audience reach at a media hierarchy level associated with at least an episode, a program or an originator.

9. The method as defined in claim 6, further including selecting the overlap multiplier based on the media genre.

10. The method as defined in claim 6, further including determining the overlap multiplier as a ratio of (1) a product of the panel duplication reach and the did-not-view reach and (2) a product of the television panel reach and the digital panel reach.

11. A tangible computer readable storage medium comprising instructions that, when executed, cause a machine to at least:
   determine a first audience reach for a television audience, the television audience representative of audience members exposed to a media campaign via television media delivery;
   determine a second audience reach for a digital audience, the digital audience representative of audience members exposed to the media campaign via digital media delivery;
   determine a first audience size for a second television audience, the second television audience representative of panelists exposed to a plurality of television campaigns associated with a media genre;
   determine a second audience size for a second digital audience, the second digital audience representative of panelists exposed to a plurality of digital campaigns associated with the media genre;
   determine a third audience size for a duplicated audience, the duplicated audience representative of panelists exposed to the plurality of television campaigns and the plurality of digital campaigns associated with the media genre;
   determine a television panel reach based on the first audience size and a panelist population based on the media genre;
   determine a digital panel reach based on the second audience size and the panelist population;
   determine a panel duplication reach based on the third audience size and the panelist population;
   determine a did-not-view reach based on the first audience size, the second audience size, the third audience size and the panelist population;
   select an odds ratio based on the media campaign;
   determine a duplication factor for the media campaign based on the first audience reach, the second audience reach and the odds ratio; and
   determine a total audience for the media campaign based on the first audience reach, the second audience reach and the duplication factor.

12. The tangible computer readable storage medium as defined in claim 11, wherein the digital media delivery includes at least a digital television platform or a digital content ratings platform.

13. The tangible computer readable storage medium as defined in claim 11, further including instructions that, when executed, cause the machine to determine the first audience reach at a media hierarchy level associated with at least an episode, a program or an originator.

14. The tangible computer readable storage medium as defined in claim 11, further including instructions that, when executed, cause the machine to select the overlap multiplier based on a media genre associated with the media campaign.

15. The tangible computer readable storage medium as defined in claim 11, wherein the instructions are further to cause the machine to determine the odds ratio based on (1) a product of the panel duplication reach and the did-not-view reach and (2) a product of the television panel reach and the digital panel reach.

* * * * *